Aug. 28, 1928.

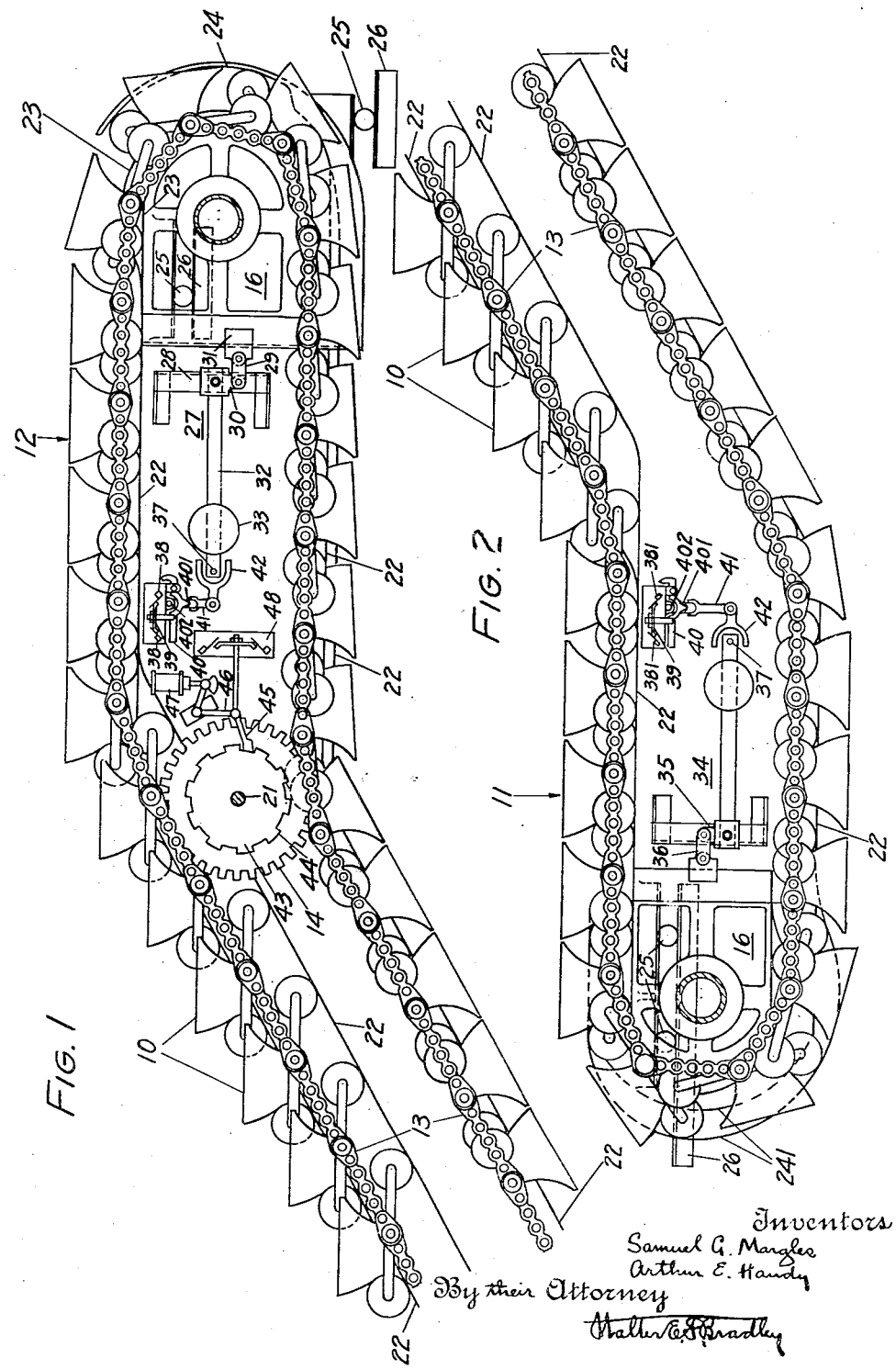

S. G. MARGLES ET AL 1,682,014

SAFETY DEVICE FOR CONVEYERS

Filed April 17, 1924    2 Sheets-Sheet 2

Inventors
Samuel G. Margles
Arthur E. Handy
By their Attorney
Walter F. Bradley

Patented Aug. 28, 1928.

1,682,014

UNITED STATES PATENT OFFICE.

SAMUEL G. MARGLES, OF BROOKLYN, AND ARTHUR E. HANDY, OF LYNBROOK, NEW YORK, ASSIGNORS TO OTIS ELEVATOR COMPANY, OF JERSEY CITY, NEW JERSEY, A CORPORATION OF NEW JERSEY.

SAFETY DEVICE FOR CONVEYERS.

Application filed April 17, 1924. Serial No. 707,167.

This invention relates to improvements in safety devices for inclined conveyers, and particularly to safety devices for moving stairways. As applied to a conveyer having driving connections to the belt at points intermediate the ends, and provided with a take-up device, the invention includes mechanism acting in conjunction with the take-up device for controlling the operation of the conveyer to stop it and its driving means in the event of any abnormal movement of the take-up device, such for example as may occur upon breaking, stretching or buckling of the belt.

The invention is illustrated in the accompanying drawings as applied to such an endless conveyer employing a chain as the belt and having a sprocket drive for the upper and lower sides of the chain. The drive is located between the ends of the conveyer, which is provided with improved types of end guides and take-up mechanisms.

The invention is embodied in the apparatus hereinafter described and illustrated in the accompanying figures of the drawings in which,—

Figure 3:
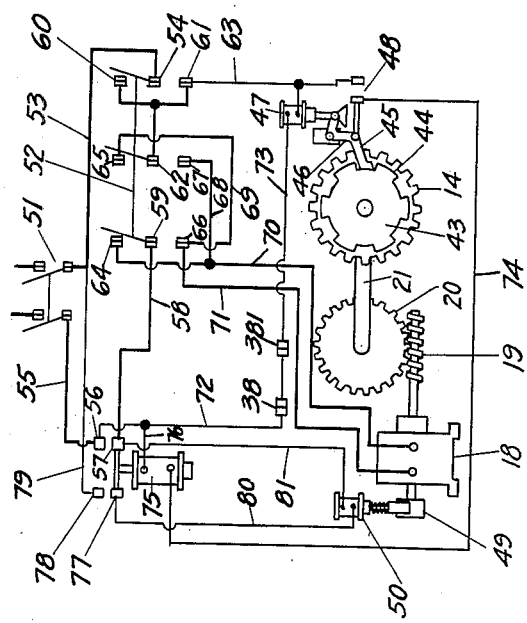
Figure 4:
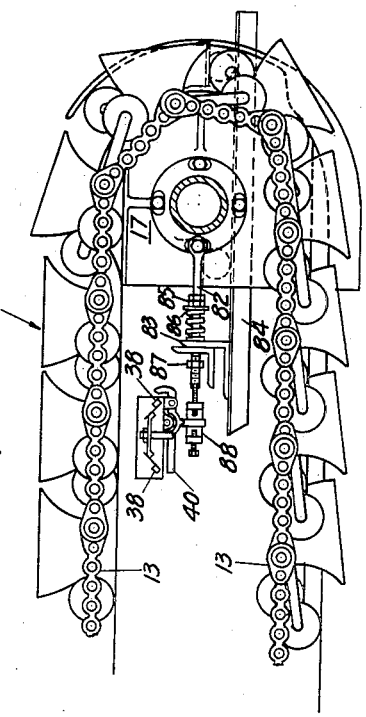
Figure 5:
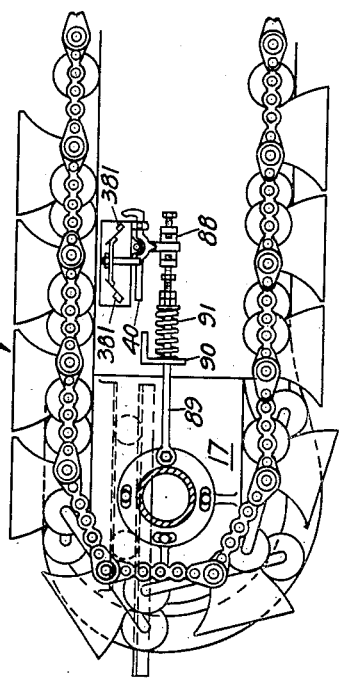

Figure 1 is a side view of the upper end of a moving stairway showing the drive sprocket, guide and take-up members with actuating equipment, Figure 2 is a similar view of the lower end of the same, Figure 3 is a diagrammatic view of the driving equipment and wiring connections, and Figure 4 and 5 are side elevations of ends of a moving stairway employing modified types of guide and take-up mechanisms.

This invention is particularly applicable to moving stairways having driving means between the ends and tensioning devices at the ends. The conveyers shown in the various figures comprise series of steps 10 which form endless movable tread platforms connecting different floor levels 11 and 12. The steps are mounted on an endless chain 13 and a driving sprocket 14 is provided to drive both the upper and lower sides. The chain 13 passes over end guides and take up mechanisms, of the form indicated generally by reference character 16 in Figures 1 and 2, and by 17 in Figures 4 and 5.

As diagrammatically shown in Figure 3 the driving sprocket 14 is driven by an electric motor 18 through any desired power transmission:—as for example by a worm 19 on the electric motor shaft engaging a worm wheel 20 on the shaft 21 upon which the driving sprocket is mounted.

The chain 13 passes over rail tracks 22 extending on each side, above and below, the driving sprocket 14 excepting at the ends where the guiding and tensioning mechanisms 16 are provided. These mechanisms 16 form continuations of the rail tracks 22, but the members are longitudinally movable with respect to the stationary tracks 22 and comprise interior and exterior track portions, 23 and 24 respectively, which co-operate with the upper and lower sections of the rail tracks 22 as shown in Figures 1 and 2. These members 16 are provided with supports 25 and horizontal guides 26 so that the tracks 23 and 24 may be moved in the direction of the fixed rail tracks 22 in either direction in the plane of the platforms on the floor levels 11 and 12.

In Figure 1, the end guide and take up member is normally urged outwardly away from the driving sprocket 14 so as to provide a tension upon the portions of the chain in the upper platform section of the conveyer beyond the driving sprocket 14. The tensioning equipment comprises a lever 27 pivoted to a frame support 28 and having a link connection 29 between its short lever arm 30 and its connection at 31 with the guide frame 16. The lever arm 30, it will be noted, is at right angles with the long lever arm 32; arm 32 extends horizontally and has a weight 33 which may be adjusted in its position along the arm for varying the outward pressure on the chain members.

In Figure 2 the lower end guide 16 which is of substantially the same construction is drawn inwardly toward the fixed track members so as to provide compression upon the belt portions of the conveyer below the driving sprocket along the inclined portions of the track and the lower platform in order to maintain the conveyer members in place and prevent them from rising from their horizontal position on the lower horizontal section of the track. This is accomplished by a bell-crank lever 34 similar in construction to lever 27 except that the short lever arm 35 thereof extends upwardly in order to provide a tension upon connecting link 36 and take up member 16. Thus the section of track 241 of this member, corresponding with section 24 of upper member 16, is normally engaged by the rollers of the chain belt members for maintaining a compressive stress on the lower section thereof.

Both levers 27 and 34 are provided with actuating pins 37 for operating electrical switches for controlling the operation of the driving members of the conveyer in the manner to be set forth. These switches each include a pair of fixed contact points 38 and 381 respectively and a movable member 39 adapted when engaging the points 38 or 381 to close the circuit of the controller. This member 39 is carried by a lever 40 which is supported by a link 401 pivoted at 402. Actuation of lever 41 in either direction displaces link 401 and allows lever 40 to fall so as to open the switch 38 or 381. These switches as shown are normally closed but in the event of the movement of the lever arms carrying pins 37 either upwardly or downwardly, the pins 37 will engage either the upper or lower portions of the bifurcated arms 42 of the lever 41 and open the circuits through these switches. These switches, as will readily be seen, are actuated by movement of the lever arms and weights, either up or down. It will thus be seen that in the event of too great a tension or compression the switches may be actuated. In case the chain breaks above the driving sprocket the upper weight will actuate to open the switch 38 and in case the chain breaks below the driving sprocket, the lower weight will actuate its switch 381.

The drive sprocket 14 is provided with brake mechanism which operates through this sprocket directly upon the conveyer. The mechanism comprises a brake drum 43 provided with teeth 44 which are adapted to be engaged between by a detent 45. This detent is mounted on a lever 46 which is adapted to be actuated by means of an electromagnet 47, represented in Figures 1 and 3 as of the solenoid type. Lever 46 is also adapted to open a circuit through a switch 48 whenever the detent is brought into engagement with member 44.

The electrical circuit connections of the various mechanisms used in conjunction with the conveyer are represented in Figure 3. It will be noted that brake 49 is used in connection with the motor shaft and is provided with electromagnetic actuating means 50, in addition to the detent braking means for the conveyer referred to above.

A source of electrical energy is brought to a supply switch 51 and is conducted to a triple-pole double throw type of reversing switch 52 by means of a wire 53 leading to a middle contact 54 from one side of the line, and the circuit from the other side of the line is made to this switch by means of wire 55, contacts 56 and 57 (when they are closed upon each other) and wire 58 to another middle contact 59 of the switch 52. Contacts 60 and 61 of the switch 52 are connected with the middle contact 62 so that when the blades of the switch are closed in either the upper or lower positions the circuit is completed from contact 54 to 62; otherwise the blades are open and circuit connections with wire 63 which is also connected with contacts 60, 61 and 62 are broken. Thus the current is brought to contacts 59 and 62 and may be passed to either contacts 64 and 65 or contacts 66 and 67 depending upon which way the blades of the switch 52 are thrown. It will be noted that 64 and 67 are connected by a wire 68 and contacts 65 and 66 are likewise connected by a wire 69, thus providing a means of reversing the current which is supplied from the switch to the motor 18. The connections of the motor from the switch are from contacts 64 and 67 through wires 68 and 70 on one side and from contacts 65 and 66 through wires 69 and 71 on the other side.

As long as the blades of switch 52 are closed on either the upper or lower set of contacts current may pass from the source of power to the electromagnet 47 for retracting the detent 45 to a non-braking position and for closing the contacts of switch 48. The circuit connections are as follows:— from one side of the line, through wire 53 to contact 54 and when switch 52 is closed, through the blade to either contact 60 or 61 and thence through wire 63 to the electromagnet 47, also to one of the contacts of switch 48, and on the other side of the line through wire 55 to contact 56, through wire 72, through the switch contacts 38, 381 of the two switches which are adapted to be operated by movement of the guide and thrust members 16 (see Figures 1 and 2) thence through wire 73 to the electromagnet 47.

As set forth, the circuit is completed from the source through wire 53 to a contact of switch 48 and upon closing this switch it is further conducted through wire 74 to an electromagnet 75; the other side of the line is connected by wire 55 to contact 56, wire 72 to wire 76 to the electromagnet. When this circuit is completed the electromagnet 75 operates to close contacts 56 and 57 so as to complete the power circuit to the reversing switch 52 and from thence to motor 18. This operation also closes contacts 77 and 78 so as to complete a circuit from the source of power through the electromagnet 50 for releasing the brake shoe of brake 49 at the same time as current is supplied to motor 18; in this circuit the current passes from one side of the line through wires 53, 79, contacts 78 and 77 and wire 80 to the electromagnet 50 and from the other side of the line through wire 55 contacts 56 and 57 and wire 81 to the electromagnet.

The members of switch 52 have been diagrammatically represented as a triple-pole double throw switch including reversing connections for the motor 18 and cut outs for various electromagnetic operating mechanisms; it will readily be seen that any desired type of switch equipment may be resorted to in conjunction with the conveyer for performing the function as heretofore set forth.

The operation of the equipment is as follows: Upon closing the blades of switches 51 and 52, the electromagnet 47 is energized so as to retract the detent 45 and close the contacts of switch 48. Closing of the latter contacts energizes electromagnet 75 which closes contacts 56 and 57 so as to pass current to motor 18, and also closes contacts 77 and 78 so as to energize electromagnet 50 for releasing the brake 49 as motor 18 starts to operate. In case either contacts 38 or 381 should be separated, that is if the chain 13 should be broken in either the upper section beyond the driving sprocket 14 or the lower section of the chain to the other side of the driving sprocket 14 so as to open these contacts, the circuit through electromagnet 47 is immediately broken, the detent 45 goes into engagement with drum 44, contacts of switch 48 are separated, thereby deenergizing electromagnet 75 so as to separate contacts 56 and 57 and contacts 77 and 78, thus breaking the circuit to the motor 18 and deenergizing the electromagnet 50 so as to apply the brake 49 on the motor drive shaft.

Figures 4 and 5 show slightly modified arrangements of the ends of the conveyer in which springs are substituted for the levers and weights employed in the equipment shown in Figures 1 and 2. In Figure 4 it will be noted that rod 82 is connected with the end guides and take ups 17, which are substantially the same in construction as the members 16 shown in Figures 1 and 2. This rod 82 passes through an aperture in a bracket 83 mounted on the supporting frame construction 84. Rod 82 carries a stop member 85 and between this member and bracket 83, spring 86 is positioned so as to normally urge the frame structure 17 outwardly as heretofore set forth in conjunction with Figure 1. Beyond bracket 83 the rod 82 is threaded for receiving a stop 87 for positively regulating the outermost position of the frame 17, and beyond this the rod carries a set of adjustable switch operating members at 88 for opening the circuit between contacts 38. The arrangement of the rod 89 and brackets 90 are similar in Figure 5 to the arrangement of rod 82 and bracket 83; in this arrangement, the same as in Figure 2, the frame 17 is drawn inwardly and thus spring 91 is arranged on the opposite side of bracket 90 from that of spring 86 with respect to its bracket. The actuation of the switch 381 by rod 89 is the same as that of switch 38 with rod 82.

What is claimed is:—

1. An electrically operated conveyer comprising a belt with an electrically operated driving means for imparting motion to the belt and having positive driving connections with two points of the belt so that portions of the belt extend from the driving means in both directions to the ends of the conveyer, and means in conjunction with each of said extending portions adapted to open the electric circuit of the electric driving means when a break occurs in either of said portions.

2. In an electrically operated conveyer the combination of a belt, a driving mechanism for both sides of the belt located between the ends of the conveyer, an electric motor for operating said driving mechanism, means for providing a tension upon the portions of the belt above said driving mechanism and means for providing a compression upon the portions of the belt extending below the driving mechanism, and safety mechanism including means for opening the circuit of the electric motor in case the belt should break either above or below said driving mechanism.

3. In an electrically operated conveyer the combination of a belt provided with steps, upper and lower platform portions, a driving mechanism for both sides of the belt located between said platform portions, an electric motor for operating said driving mechanism, means for providing a tension upon the portions of the belt above said driving mechanism and means for providing a compression upon the portions of the belt extending below the driving mechanism, and safety mechanism for the conveyer including means for opening the circuit of the electric motor in case the belt should break either above or below said driving mechanism.

4. In an electrically operated conveyer the combination of a belt provided with steps, upper and lower platform portions, a driving mechanism for both sides of the belt located between said platform portions, an electric motor for operating said driving mechanism, means for providing a tension upon the portions of the belt above said driving mechanism and means for providing a compression upon the portions of the belt extending below the driving mechanism, and safety mechanism for the conveyer including means adapted to be actuated by said tensioning or compressing means upon the breaking of the belt for opening the circuit of the electric motor.

5. An electrically operated conveyer comprising a belt having an inclined section and two horizontal sections at the ends of the inclined section, an electrically operated driving means for imparting motion to the belt and having positive driving connections with both the upper and lower sides of the belt in the inclined section below the upper horizontal section, a tension device for the portion of the belt above the driving means, and a compression device for the portion of the belt below said driving means, and switches operatively connected with said tension and compression devices adapted to be opened by movement of the said devices for opening the circuit to the electrically operated driving means.

6. An electrically operated conveyer comprising a belt with an electrically operated driving means for imparting motion to the belt, stationary tracks for the belt, and an end guide and take up member beyond the track ends adapted to move in a direction coextensive with the tracks to form an endless path for the belt, means operating upon the guide and take up member to move it in a direction opposite to that in which gravity tends to move the belt, and a switch mechanism in conjunction with the last said means adapted to open the circuit to the driving means for stopping the conveyer in case of movement of the guide and take up member in either direction.

7. A conveyor comprising, a belt, driving mechanism for said belt, movable guiding means for one end of the belt, movable guiding means for the other end of the belt, a safety device operated by the guiding means for said one end of the belt upon movement thereof to cause the stopping of said driving mechanism, and a safety device operated by the guiding means for the other end of the belt upon movement thereof to cause the stopping of said driving mechanism.

In testimony whereof, we have signed our names to this specification.

SAMUEL G. MARGLES.
ARTHUR E. HANDY.